United States Patent [19]

Ballard

[11] Patent Number: 5,024,404

[45] Date of Patent: Jun. 18, 1991

[54] PIPE CLAMP FOR OVERHEAD SPRINKLER HEADS AND THE LIKE

[76] Inventor: Estus E. Ballard, 6382 Bayhill Dr., Abilene, Tex. 79606

[21] Appl. No.: 334,309

[22] Filed: Apr. 6, 1989

Related U.S. Application Data

[63] Continuation-in-part of Ser. No. 110,351, Oct. 19, 1987, Pat. No. 4,834,186.

[51] Int. Cl.5 .................................................. F16L 3/00

[52] U.S. Cl. .......................................... 248/62; 24/268; 248/74.4

[58] Field of Search ..................... 248/62, 59, 60, 74.1, 248/74.4, 74.5, 65, 67.5, 56, 57, 55, 58; 24/268, 19, 20 LS

[56] References Cited

U.S. PATENT DOCUMENTS

| | | | |
|---|---|---|---|
| 796,178 | 8/1905 | Beaton | 248/57 |
| 844,977 | 2/1907 | Van Brunt | 248/74.1 |
| 883,613 | 10/1906 | Maiser | 248/57 |
| 949,576 | 2/1910 | Hunter | 248/57 |
| 2,069,163 | 1/1937 | Hibner, Jr. | 248/74.4 X |
| 2,474,062 | 6/1949 | Murphy | 24/268 X |
| 2,555,378 | 6/1951 | Shuter | 24/19 |
| 2,627,635 | 2/1953 | Seltzer | 24/268 |
| 2,778,085 | 1/1957 | Bernard | 24/268 |
| 2,803,866 | 8/1957 | Flora . | |
| 2,922,212 | 1/1960 | Textrom | 24/268 |
| 4,087,190 | 5/1978 | Haeder | 24/268 X |
| 4,360,178 | 11/1982 | Senter | 248/65 X |
| 4,563,795 | 1/1986 | Fournier | 24/19 |
| 4,669,911 | 1/1987 | Lundgren et al. | 24/19 X |
| 4,717,099 | 1/1988 | Hubbard | 248/57 |
| 4,799,444 | 1/1989 | Lisowski | 248/62 X |
| 4,834,186 | 5/1989 | Ballard | 248/59 X |

FOREIGN PATENT DOCUMENTS

| | | | |
|---|---|---|---|
| 812529 | 5/1937 | France | 248/74.4 |
| 992116 | 5/1965 | United Kingdom | 24/268 |

*Primary Examiner*—David L. Talbott

*Attorney, Agent, or Firm*—Cahill, Sutton & Thomas

[57] ABSTRACT

A pair of opposed clamp halves for circumscribingly engaging a sprinkler head supporting pipe are attachable to one another about the pipe and include anchor plates at the distal ends for attachment to an anchor point. The proximal ends of the clamp halves define a pair of ramps tapering in opposed directions. Each of first and second wedges engages one of the pair of ramps. A threaded member, threadedly interconnecting the wedges, draws the wedges toward one another to urge the proximal ends of the clamp halves toward one another into gripping engagement with the circumscribed pipe through the wedging action mainfested by the pair of ramps.

29 Claims, 3 Drawing Sheets

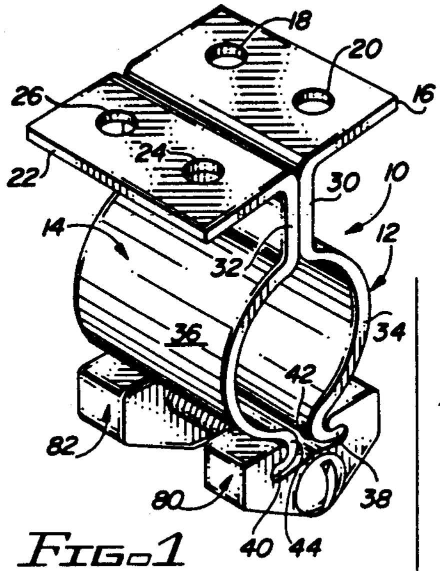
FIG. 1
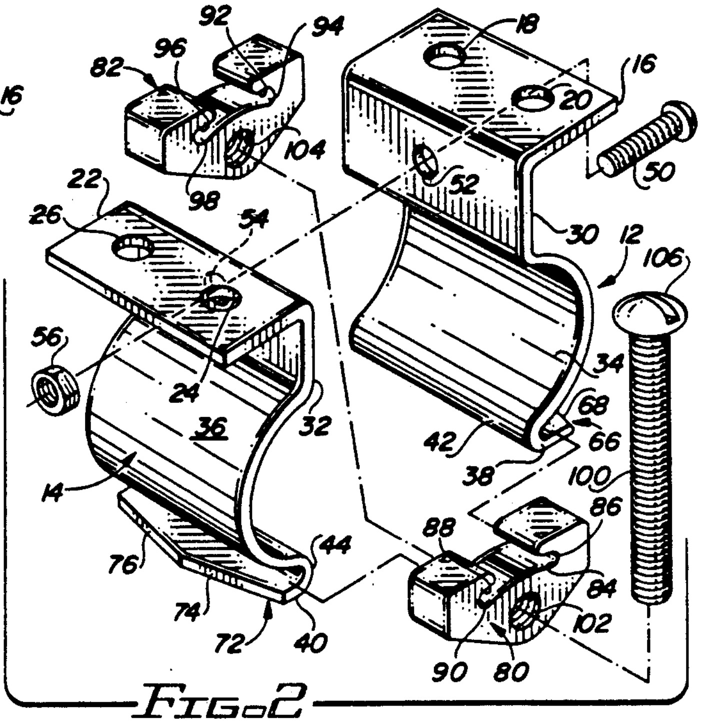
FIG. 2
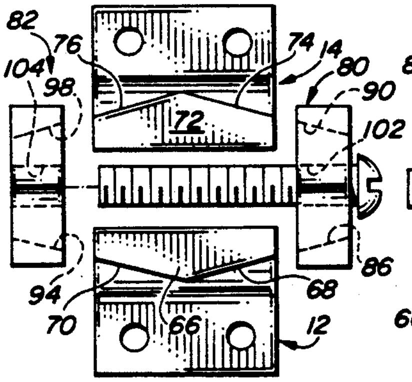
FIG. 3A
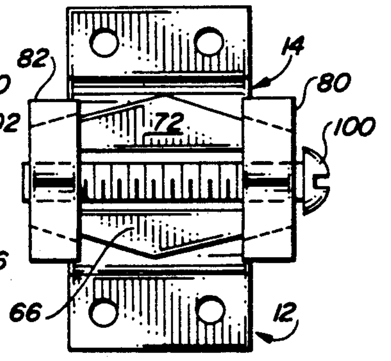
FIG. 3B
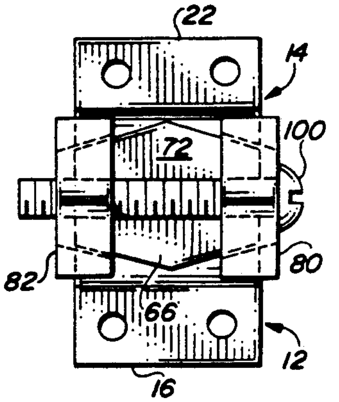
FIG. 3C
FIG. 4
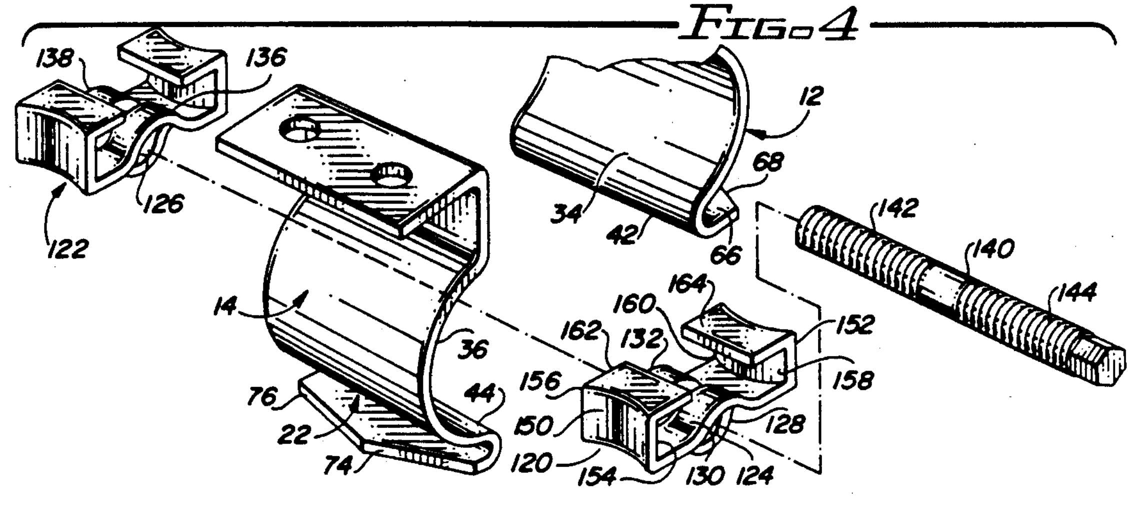

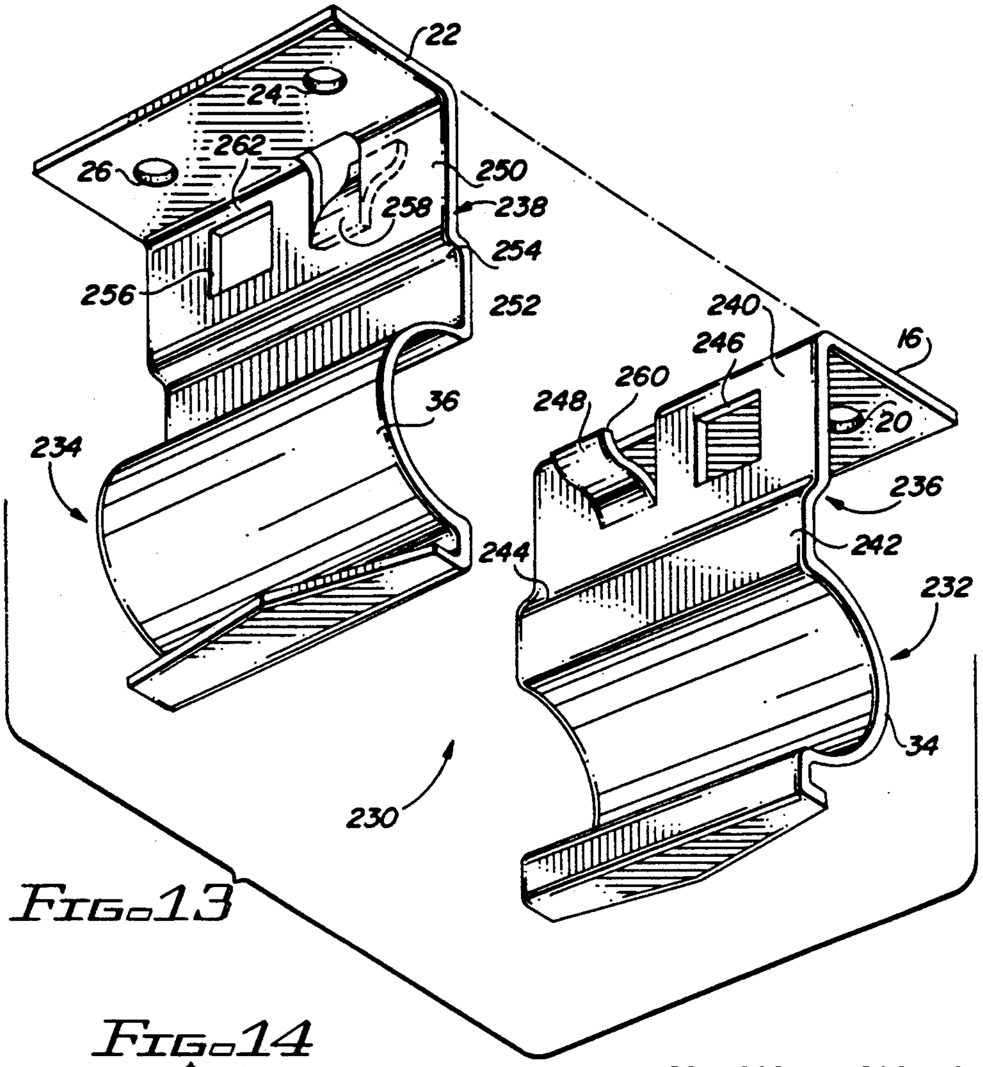
FIG. 13
FIG. 14
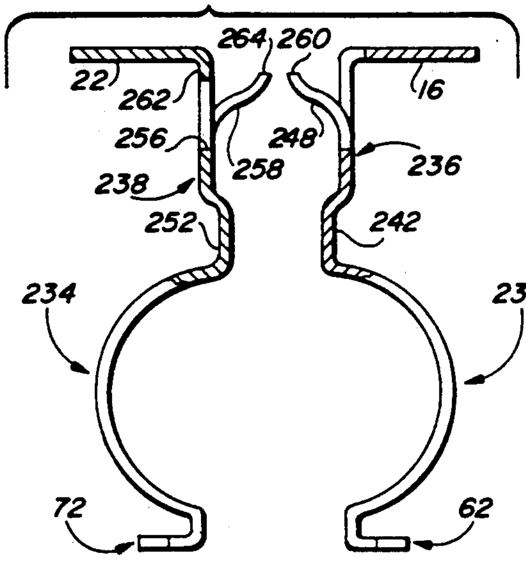
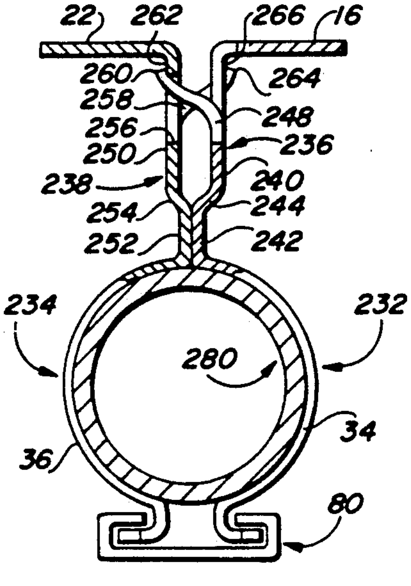
FIG. 15

PIPE CLAMP FOR OVERHEAD SPRINKLER HEADS AND THE LIKE

RELATED APPLICATIONS

The present application is a continuation in part of a copending patent application entitled "SPRINKLER HEAD MOUNTING SYSTEM", Ser. No. 110,351, filed Oct. 19, 1987, now U.S. Pat. No. 4,834,186 issued May 30, 1989, owned by and describing an invention invented by the present inventor.

BACKGROUND OF THE INVENTION

1. Field of the Invention

The present invention relates to pipe clamps and, more particularly, to clamps for attaching overhead sprinkler head supporting pipes.

2. Description of the Prior Art

Overhead sprinkler heads are in fluid communication with and supported by pipes forming a part of a fire dousing watering system. Building codes require that the pipe ends in proximity to the supported sprinkler heads be capable of supporting an axially imposed force of 700 lbs. In addition, the clamps must be able to withstand substantial vibration for a period of time. As a practical matter, such clamps must permit relatively facile axial repositioning of the pipe to correctly locate the sprinkler head with respect to the ceiling. Moreover, any ceiling replacement with an accompanying change in ceiling height should be accommodatable.

A number of clamps have been developed which provide adequate retentive force, readjustment of pipe position or sufficiently firm anchoring of the clamp to an anchor point. However, few of the prior art clamps permit adjustment from below with a simple tool, such as a screwdriver. In the event adjustment is only possible from above, removal of the finished ceiling to provide access for a workman may be necessary. Such requirement complicates the procedure and renders it more difficult to quickly set an attached sprinkler head at the correct height. A requirement for using two tools simultaneously prevents a workman from using one hand to relocate the sprinkler head during loosening and retightening of a clamping device. Because cost is always a factor and as a large number of clamps may be necessary for installation of sprinkler heads in any particular building, clamps for this purpose must be relatively inexpensive without jeopardizing structural strength or ease of use. This combination of benefits is not available from the known prior art sprinkler head pipe clamps.

SUMMARY OF THE INVENTION

A pair of clamp halves circumscribingly engage and grip a pipe. The distal end of the clamp halves are rigidly secured to one another, which end defines an anchor for attachment to a supporting location. The proximal end of the clamp halves together define a pair of opposed tapered ramps. A translatable wedge engages each tapered ramp. A threaded member, rigidly engaged with the pair of wedges, draws the wedges toward one another, which wedging action bearing against the ramps urges the clamp halves toward one another to grippingly engage the circumscribed pipe. A slot or head is disposed at the lower end of the threaded member to permit rotation from a point proximate the sprinkler head supported by the clamped pipe to permit vertical repositioning of the sprinkler head with respect to an adjacent ceiling.

It is therefore a primary object of the present invention to provide an opposed wedging action for a pipe clamp to securely grip the pipe.

Another object of the present invention is to provide a pair of detachably attached mirror image clamp halves for grippingly engaging a pipe.

Still another object of the present invention is to provide a lead screw rotatable from a predetermined direction for drawing opposed wedges toward one another to urge opposed halves of a pipe clamp to grip a circumscribed pipe.

Yet another object of the present invention is to provide a pair of oppositely tapering ramps defined by opposed clamp halves for mating with opposed wedges to draw the clamp halves toward one another.

A further object of the present invention is to provide a dual mechanical advantage by use of a screw and a double wedge action to draw a pipe clamp into gripping engagement with a circumscribed pipe.

A still further object of the present invention is to provide an inexpensive structurally sound pipe clamp for anchoring an overhead sprinkler head supporting pipe.

A yet further object of the present invention is to provide a clamp for anchoring a sprinkler head supporting pipe, which clamp is grippingly adjustable from a location proximate the sprinkler head to set the sprinkler head at a predetermined height with respect to a surrounding ceiling.

A yet further object of the present invention is to provide a pair of detachably interlockingly attached mirror image clamp halves for grippingly engaging a pipe.

A yet further object of the present invention is to provide a method for securing a pipe to a structural support.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is an isometric view of a pipe clamp;

FIG. 2 is an exploded view of the major components of the pipe clamp illustrated in FIG. 1;

FIGS. 3A, 3B and 3C illustrate the gripping action of a pipe clamp through translation of opposed wedges;

FIG. 4 is an exploded view of the major components attendant a first variant of the pipe clamp;

FIG. 13 is an isometric view of the clamp halves of a variant pipe clamp;

FIG. 14 is a side view of the variant clamp halves in juxtaposed relationship; and FIG. 15 illustrates the variant pipe clamp engaging a pipe.

DESCRIPTION OF THE PREFERRED EMBODIMENT

Figure 5:
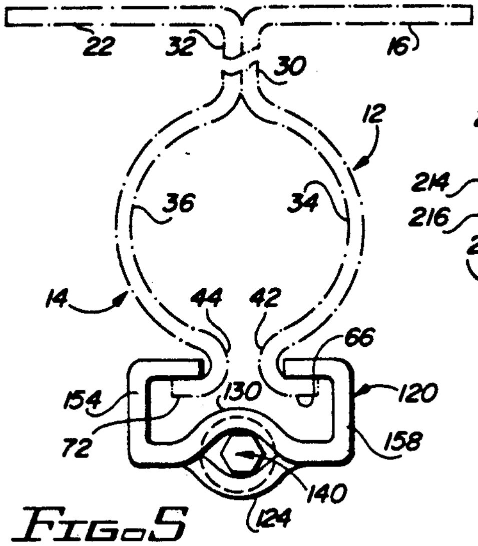
FIG. 5 is an end view of the variant shown in FIG. 4.
Figure 9:
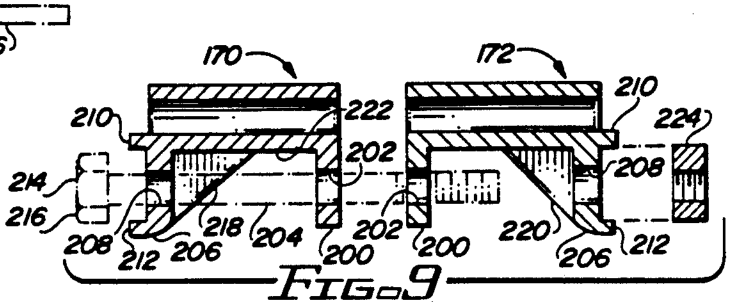
FIG. 9 is a cross sectional view taken along lines 9—9, as shown in FIG. 8.
Figure 10:
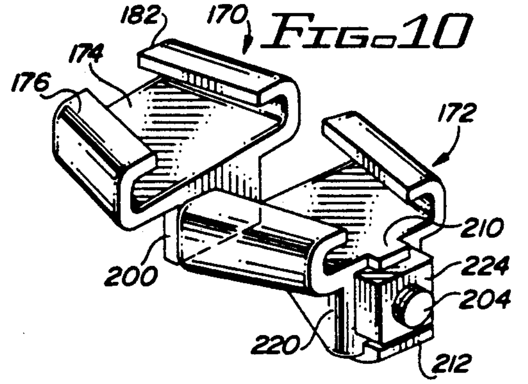
FIG. 10 is an isometric view of the further variant dual wedges secured to one another.

Referring to FIGS. 1, 2, 3A, 3B and 3C, there is shown a pipe clamp 10 having a pair of clamp halves 12,14 for circumscribingly gripping a pipe. The clamp halves are preferably mirror images of one another to reduce manufacturing costs and the number of parts necessary to be manufactured. Clamp half 12 includes an anchor plate 16 having a pair of apertures 18,20 disposed therein. Since it is contemplated that pipe clamp 10 will be attached to a ceiling joist or the like, it is preferable that anchor plate 16 is disposed in a plane parallel with the axis of the pipe receiving cylinder defined by the opposed clamp halves. Clamp half 14 includes a similar anchor plate 22 having apertures 24,26 disposed therein. Apertures 18,20,24 and 26 are sized to accommodate attachment means, such as screws, bolts or the like for attaching anchor plates 16,22 to a supporting location.

Clamp half 12 includes a spacer section 30 to displace the clamped pipe a set distance from the supporting location. Clamp half 14 includes a similar spacer section 32. A near semicylindrical section 34 extends from spacer section 30 for partially circumscribing a pipe to be clamped. A similar semicylindrical section 36 extends from spacer 32. End segments 38,40 of clamp halves 12 and 14, respectively, are folded back upon their respective semicylindrical sections to define a longitudinally aligned space between respective folds 42,44. Preferably, the circumferential distance defined only by the combination of semicylindrical sections 34,36 and the space between folds 42,44 is greater than the circumference of the pipe to be clamped to permit longitudinal translation of the pipe within the clamp. To obtain a rigid clamping action, it is mandatory that the circumferential distance defined by semicylindrical sections 34 and 36 be less than the circumference of the pipe to be clamped. Thereby, upon drawing end segments 38,40 toward one another, semicylindrical sections 34,36 will circumscribingly engage and clamp a pipe inserted therebetween.

Upon attachment of anchor plates 16,22 to a supporting location, spacer plates 30,32 will be positionally fixed with respect to one another and correspondingly support semicylindrical sections 34,36. However, to simplify mounting of pipe clamp 10 it may be preferable to weld or otherwise attach the spacer sections to one another. Alternatively, the spacer sections may be secured to one another by nut and bolt means, as illustrated in FIG. 2. Herein, a bolt 50 penetrably engages apertures 52,54 in spacer sections 30,32, respectively. A nut 56 threadedly engages bolt 50 to draw and maintain the spacer sections in rigid contact with one another. For greater mechanical stability, a pair of nut and bolt means may be employed. In existing locations, the use of the clamp halves is of particular benefit. That is, clamp halves 12 and 14 can be secured about the pipe at the anchor point for the pipe clamp to a supporting joist or the like and it is not necessary to pass the pipe clamp from a free end of the pipe to the anchor point. Where one end of an existing pipe is not free of a sprinkler head, existing point(s) of attachment, or non traversable bends or branches, this capability is of particular importance.

Terminal end 66 of end segment 38 defines a pair of straight edges 68,70 (not shown in FIGS. 1 and 2) intersecting at an obtuse angle at the midpoint of the end section. Terminal end 72 of end section 40 includes a pair of similar edges 74,76 intersecting one another at an obtuse angle at the midpoint of the end section. Upon mating of the clamp halves with one another, it will be noted that edge pairs 68,74 and 70,76 define a pair of ramps tapering in opposed directions.

A pair of wedges 80,82 engage the opposed ramps. Wedge 82 includes an undercut 84 for engaging end 66. Interior edge 86 of the undercut may be angled at an angle commensurate with that of edge 68. A further undercut 84 is formed in wedge 80 to receive terminal end 72. Interior edge 90 of this undercut may be angled commensurate with edge 74. Wedge 82 includes an undercut 92 having an interior edge 94 angled commensurate with the angle of edge 70. A further undercut 96 receives terminal end 72 and interior edge 98 may be angled commensurate with edge 76.

By inspection, it will be evident that as wedge 80 is translated along edges 66,74, a wedging action results which will tend to urge folds 42,44 toward one another. Similarly, translation of wedge 82 along edges 70,76 will urge translation of folds 42,44 toward one another. To balance the forces imposed at opposed edges of the clamp halves, the two wedges are free floating and secured to one another by threaded engagement with a bolt 100. Wedges 80,82 include threaded apertures 102,104, respectively, for this purpose. Because of the floating action of the opposed wedges, skewing or misalignment of the clamp halves with respect to the longitudinal axis defined by semicylindrical sections 34,36 will be discouraged. Accordingly, relatively uniform forces will be imposed by the semicylindrical sections upon a gripped pipe. As will be noted, slot 106 will permit rotation of bolt 100 by engagement with a screwdriver. Alternatively, the slotted head of the bolt could be replaced with a socket compatible head or other engagement means. By appropriately threading apertures 102 and 104 in wedges 80,82 and the bolt rotation of the bolt in one direction will cause the wedges to translate toward one another while opposed rotation will result in translation of the wedges in an opposed direction.

Figure 6:
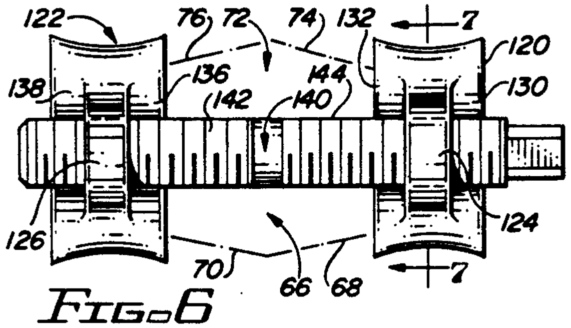
FIG. 6 is a detail view of the dual wedging action of the variant shown in FIG. 4.
Figure 11:
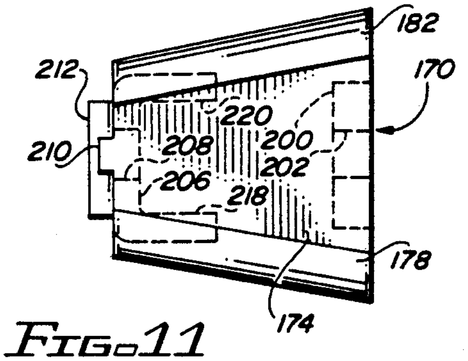
FIG. 11 is a top view of a wedge of the further variant.
Figure 7:
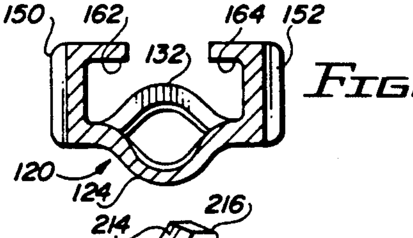
FIG. 7 is a cross sectional view taken along lines 7—7, as shown in FIG. 6.
Figure 8:
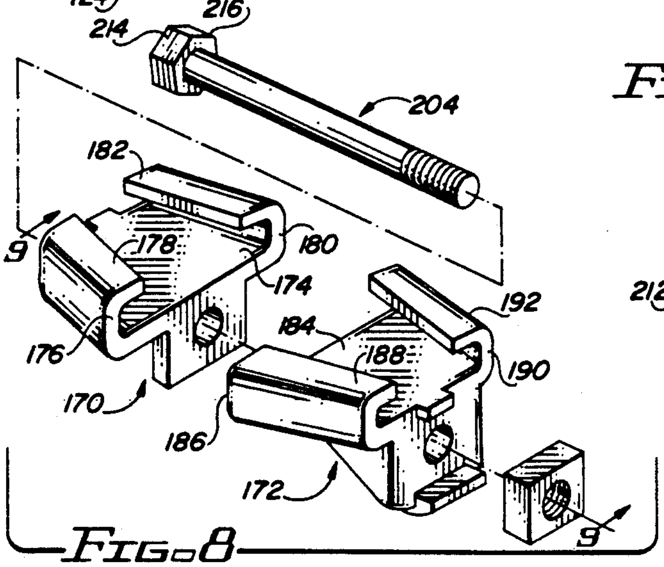
FIG. 8 is an exploded view of a further variant of the pipe clamp.
Figure 12:
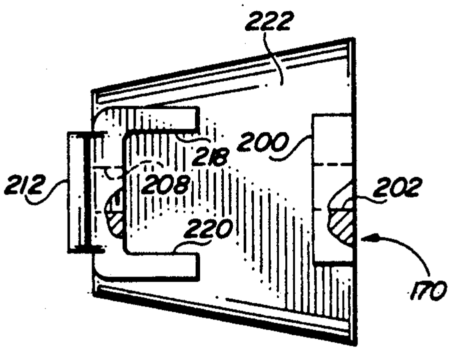
FIG. 12 is bottom view of a wedge of the further variant.

Referring to FIG. 4 there is illustrated a variant configuration of wedges 80,82. Wedge 120, corresponding with wedge 80, and wedge 122, corresponding with wedge 82, are formed of sheet material. As further shown in FIGS. 5, 6 and 7, threaded segments 124, 126 is formed by developing a pair of slits in spaced apart relationship at the center of the respective wedges. The ribbon segment defined thereby is displaced in one direction with the remaining adjacent ribbons (130,132 and 136,138) being displaced in the opposed direction. Preferably, the oppositely oriented ribbons define semi circular arcs commensurate in size with a threaded member to be engaged therewith.

Wedges 120, 122 are mirror images of one another and threaded shank 140 has half 142 threaded in one direction and half 144 threaded in the opposite direction in order to obtain opposite movement of wedges 120,122 upon rotation of the shank.

Each of wedges 120,122 includes a pair of opposed end walls 150,152 defining opposed angled surfaces 154,156 and 158,160, respectively. Each of these angled surfaces in end wall 150 engages one of edges 74,76 of terminal end 72. Similarly, each of angled surfaces 158,160 of end wall 152 engages one of edges 68,70 of terminal end 66. Overhang 162 extending from end wall 150 overlaps terminal end 72. Similarly, overhang 164 extending from end wall 152 overlaps terminal end 66.

While wedges 120,122 are illustrated as having opposed end walls 150,152 formed by opposed angled surfaces 154,156 and 158,160, it is to be understood that each end wall may be formed of a single angled element, like that (86,90,94 or 98) shown with respect to wedges 80 or 82 (see FIGS. 3A, 3B and 3C). Moreover, end walls 150,152 are illustrated as being relatively high; such height is shown primarily for illustrative purposes. A commercial embodiment of wedges 120,122 would have much relatively less high end walls 150,152 or even be of no more height than necessary to receive the thickness of terminal ends 66 and 72 of the clamp halves.

Upon inspection, it will be evident that upon rotation of shank 140, wedges 120,122 will be drawn toward one another to bring folds 42,44 of clamp halves 12,14 toward one another and result in gripping of a circumscribed pipe by semicylindrical sections 34,36. Upon rotation of shank 140 in the opposite direction the semicylindrical sections will be displaced from one another to release the pipe therebetween.

Referring jointly to FIGS. 8 to 12, there is illustrated a yet further variant of wedges 80,82. Wedges 170,172 may be formed from sheet metal or they may be cast. Wedge 170 includes a planar surface 174 having a pair of opposed converging edges for supporting terminal ends 66,72 of clamp halves 12,14. End wall 176 extends upwardly from surface 174 for engaging the respective edge of the engaged terminal end. An overhang 178 prevents disengagement with the engaged terminal end. A further end wall 180 extends from surface 174 to engage an edge of the opposed terminal end and overhang 182 prevents disengagement with such terminal end. Wedge 172 includes a surface 184, end walls 186,190 and overhangs 188,192 which correspond with the similar elements of wedge 170. Thereby, upon drawing wedges 170,172 toward one another upon engagement of clamp halves 12,14, folds 42,44 of the clamp halves will be drawn toward one another to cause a circumscribed pipe to be grippingly engaged by the clamp halves. Correspondingly, displacement of wedges 170,172 from one another will release a pipe gripped between the clamped halves.

Referring particularly to FIGS. 9 to 12, apparatus for translating wedges 170,172 with respect to one another will be described. Wedge 170 includes a downwardly extending flange 200 having an aperture 202 disposed therein for penetrable engagement by a bolt 204. A further flange 206 extends from wedge 170, which flange includes an aperture 208 for penetrably receiving the shaft of bolt 204. A pair of opposed tabs 210,212 extend from flange 206 in general axial alignment with aperture 208. These tabs are laterally spaced from opposed flats 214 disposed about head 216 of bolt 204 to prevent interference therebetween and to accommodate rotation of the bolt upon penetrable engagement of the shaft of the bolt through apertures 208 and 202. To counter the bending forces imposed upon flange 206 resulting from the axially aligned forces created upon drawing wedges 170,172 toward one another, a pair of webs 218,220 extend between the rear surface of flange 206 and underside 222 of wedge 170.

Wedge 172 is constructed identically with wedge 170. Accordingly, it includes flange 200 having aperture 202 disposed therein and flange 206 supported by webs 218,220. Flange 206 is apertured with aperture 208 to receive the shaft of bolt 204. Tabs 210,212 serve the purpose of retaining and preventing rotation of a square nut 224. Upon engagement and rotation of bolt 20 with nut 224 the bolt will become threadedly inserted within or extracted from the nut and wedges 170,172 will be displaced toward or away from one another, respectively.

Under certain circumstances it may be preferable to avoid the manufacture and use of tabs 210,212 in wedges 170 and 172. To secure the threaded end of bolt 204, a nut known as a PEM would be used. It has the advantage of avoiding the misalignment common with conventional nuts. Moreover, if wedges 170,172 are of sheet metal, a PEM is readily partially inserted into aperture 208 of one of the pair of wedges. The inserted portion, being of a smaller diameter than the generally circular nut, not only can engage the aperture but includes serrations for retainingly engaging the aperture and for preventing rotation during tightening of bolt 204.

From this description it will become apparent that wedges 170,172 may be mirror images of one another. Such identical configuration substantially reduces the manufacturing costs. Furthermore, as bolt 204 and nut 224 may be of the type commercially available in large quantities at minimal cost, the expenses of assembly are substantially reduced.

From the above description, it will become evident that each of the three pairs of coacting opposed wedges described above are usable with a common pair of clamp halves. Depending upon considerations of use and strength commensurate with respective manufacturing costs, one or another pair of opposed wedges may be a preferred choice for a particular application. Considering that the clamp halves may be mirror images of one another and that the clamp halves may be stamped out of sheet material, the expenses of the pipe clamp illustrated and described will be minimal and commensurate with the use to which a particular configuration is to be applied. Moreover, it will be evident that a simple turning motion of the connecting bolt can be effected from beneath a sprinkler head to tighten or loosen the clamp.

Referring jointly to FIGS. 13, 14 and 15, variant pipe clamp 230 having clamp halves 232,234 is shown. The major distinction between variant pipe clamp 230 and pipe clamp 10 (shown in FIGS. 1 and 2) relates to the configuration of the spacer section. That is, the configuration of spacer sections 236,238 permits these spacer sections to be in locking engagement with one another without the use of bolt 50 and nut 56 (as shown in FIG. 2).

Spacer section 236 includes a planar section 240 and a pedestal section 242 joined to one another by a ramp section 244. An aperture 246 is formed in planar section 240. A tang 248 extends from the planar section; it may be formed from the planar section by slitting the material of the planar section along three lines to define the end and opposed sides of the tang. The further end of the tang is a part of the planar section. After the tang has been slit, it is bent to the configuration illustrated. Similarly, spacer section 238 includes a planar section 250 joined to a pedestal section 252 by a ramp 254. The planar section includes an aperture 256 and a tang 258. This tang, like tang 248, may be formed from its planar section 250 by three slits to define an end and the opposed sides and bent to shape.

Referring specifically to FIGS. 14 and 15, it will be noted that tangs 248 and 258 are S shaped and mirror images of one another. Upon assembling clamp half 232 with clamp half 234, tang 248 is penetrably inserted through aperture 256 and tang 258 is penetrably inserted through aperture 246. Upon bringing the clamp halves toward one another by pivotal action after engagement of the tangs with the respective apertures, end 260 of tang 248 will contact and bear against surface 262 adjacent the upper edge of aperture 256. Similarly, end 264 of tang 258 will bear against surface 266 defining the upper edge of aperture 246.

Upon engagement of ends 260,264 of tangs 248,258 with surfaces 262,266, respectively, pedestal sections 252,242 will bear against one another, as illustrated in FIG. 15. It will therefore become evident that spacer sections 236,238 of variant pipe clamp 230 will become interlocked with one another upon engaging the tangs with the respective apertures and positioning the pedestal sections adjacent one another. The resulting interlock will secure the clamp halves to one another as effectively as the use of nut and bolt means (as shown in FIG. 2) or other attachment mechanisms.

It may be noted that one of the benefits attendant variant pipe clamp 230 is the elimination of further parts to engage the pipe clamp halves with one another adjacent anchor plates 16,22. Moreover, the time required to install the variant pipe clamp to a supporting structure is substantially reduced by using the configuration attendant variant pipe clamp 230.

The previously described terminal ends 62,72 are employed with clamp halves 232,234. Wedge 80, or one of the variants thereof described above, may be used to secure semi cylindrical sections 34,36 to an encircled pipe 280.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A pipe clamp for engaging a pipe supporting an overhead sprinkler head, said pipe clamp comprising in combination:

(a) first and second pipe clamp halves for engaging and gripping the pipe, each of said clamp halves including a distal end and a proximal end;

(b) means disposed at the distal end of each of said clamp halves or anchoring said pipe clamp;

(c) a terminal end disposed at the proximal end of each of said clamp halves, each of said terminal ends being defined by a single fold extending across the respective one of said clamp halves;

(d) a pair of oppositely tapering ramps disposed at said terminal end of each of said clamp halves and proximally of said single fold, each pair of said oppositely tapering ramps including a first ramp tapered in one direction and a second ramp tapered in the opposite direction;

(e) first wedge means being C shaped in cross section and disposed upon the pair of said tapering first ramps for drawing the proximal ends of said clamp halves toward one another to clamp the pipe disposed between said clamp halves;

(f) second wedge means being C shaped in cross section and disposed upon the pair of said tapering second ramps for drawing the proximal ends of said clamp halves toward one another to clamp the pipe disposed between said clamp halves; and (g) means interconnecting said first and second wedges for translating said first and second wedges in concert toward and away from one another to draw and to loosen, respectively, said pipe clamp about the engaged pipe.

2. The pipe clamp as set forth in claim 1 wherein each of said clamp halves includes a near semicylindrical section disposed between the distal end and the proximal end for receiving part of the pipe to be clamped.

3. The pipe clamp as set forth in claim 1 wherein each of said first and second wedge means includes a pair of opposed undercuts for receiving the respective ones of said first and second ramps.

4. The pipe clamp as set forth in claim 3 wherein each ramp of said first and second ramps includes a straight edge and wherein said straight edges of said first and second ramp intersect one another at an obtuse angle and wherein each of said undercuts receives and engages respective ones of said straight edges.

5. The pipe clamp as set forth in claim 4 wherein each of said undercuts is angled commensurate with the angle of the engaged one of said straight edges.

6. The pipe clamp as set forth in claim 1 wherein each ramp of said first and second ramps includes a straight edge and wherein said straight edges of said first and second ramps intersect one another at an obtuse angle.

7.. The pipe clamp as set forth in claim 6 wherein each of said first and second wedge means includes means for receiving said straight edges of said first ramps and of said second ramps, respectively.

8. The pipe clamp as set forth in claim 7 wherein each of said first and second wedge means may be cast.

9. The pipe clamp as set forth in claim 1 wherein each of said first and second wedge means includes a threaded passageway and wherein said interconnecting means includes a bolt having a threaded shaft for engaging said pair of threaded passageways to draw said first and second wedge means in concert toward and away from one another upon rotation of said bolt in a first and second direction, respectively.

10. The pipe clamp as set forth in claim 9 wherein each of said first and second wedge means is formed of sheet material.

11. The pipe clamp as set forth in claim 1 wherein each of said first and second wedge means includes a pair of apertured depending flanges for receiving said interconnecting means.

12. The pipe clamp as set forth in claim 11 wherein said interconnecting means includes a nut and a bolt for threadedly engaging said nut.

13. The pipe clamp as set forth in claim 12 wherein one of said flanges includes means for capturing said nut to prevent rotation of said nut upon rotation of said bolt to displace said first and second wedge means with respect one another.

14. The pipe clamp as set forth in claim 13 including web means for stabilizing at least one of said flanges of each of said first and second wedge means.

15. The pipe clamp as set forth in claim 14 wherein said first and second wedge means may be cast.

16. The pipe clamp as set forth in claim 1 wherein each of said anchoring means includes an anchor plate.

17. The pipe clamp as set forth in claim 1 including means for securing the distal ends of said clamp halves with one another.

18. The pipe clamp as set forth in claim 1 wherein each of said clamp halves is a duplicate of the other.

19. The pipe clamp as set forth in claim 18 wherein each of said clamp halves is formed of sheet material.

20. The pipe clamp as set forth in claim 19 wherein each of said clamp halves is formed of a ribbon of said sheet material.

21. The pipe clamp as set forth in claim 1 wherein the distal end of each of said clamp halves includes a spacer section and including means for securing said spacer sections to one another.

22. The pipe clamp as set forth in claim 21 wherein said securing means comprises nut and bolt means.

23. The pipe clamp as set forth in claim 21 wherein said securing means comprises means for interlocking said spacer sections with one another.

24. The pipe clamp as set forth in claim 23 wherein said interlocking means comprises a tang and an aperture disposed in each of said spacer sections, said tang of one of said spacer sections being configured to penetrate and bear against a surface defining the aperture of the other of said spacer sections upon mating of said clamp halves with one another.

25. The pipe clamp as set forth in claim 24 wherein said clamp halves are mirror images of one another.

26. The pipe clamp as set forth in claim 24 wherein each of said tangs is formed from a segment of material of the respective one of said spacer sections.

27. A method for securing a pipe to a supporting structure, said method comprising the steps of:

(a) encircling the pipe with a pair of clamp halves, each of the clamp halves including: an anchor for attachment to the supporting structure; a partial cylindrical section for encircling a segment of the pipe; a spacer section interconnecting the anchor with the partial cylindrical section; and, a terminal end defined by a single fold extending across the respective partial cylindrical section and having a terminal edge disposed proximally of the single fold and defining oppositely tapered intersecting first and second ramps;

(b) securing the anchors of the clamp halves to the supporting structure; and (c) translating in concert first and second wedges, each wedge being C shaped in cross section, toward one another along the respective pair of first and second ramps to draw the terminal ends toward one another to clamp the pipe within the partial cylindrical sections.

28. The method as set forth in claim 27 including the step of interlocking the spacer sections with one another.

29. The method as set forth in claim 28 wherein each spacer section includes a tang and an aperture and wherein said step of interlocking includes the step of engaging the tank of one spacer section with the aperture of the other spacer section.

* * * * *